United States Patent

[11] 3,617,800

[72] Inventors Kazuo Ishikawa Kadoma; Hiroshi Yamashita, Neyagawa, both of Japan
[21] Appl. No. 30,062
[22] Filed Apr. 20, 1970
[45] Patented Nov. 2, 1971
[73] Assignee Matsushita Electric Industrial Co., Ltd. Osaka, Japan
[32] Priority May 6, 1969
[33] Japan
[31] 44/35884

[54] DEGAUSSING DEVICE FOR COLOR TELEVISION RECEIVER
1 Claim, 4 Drawing Figs.

[52] U.S. Cl. .......... 315/8, 317/157.5

[51] Int. Cl. .......... H01j 29/06
[50] Field of Search .......... 315/8; 317/157.5

[56] References Cited

UNITED STATES PATENTS 3,555,343 1/1971 Allen .......... 317/157.5

*Primary Examiner*—John Kominski
*Attorney*—Stevens, Davis, Miller & Mosher

ABSTRACT: A degaussing device for color television receiver, wherein the degaussing time is extremely shortened and the current value flowing through the degaussing coil after the degaussing is completed is minimized by making elaborate use of the actions of a thermistor having a positive temperature coefficient, thermistor having a negative temperature coefficient and a varistor.

PATENTED NOV 2 1971 3,617,800

K. ISHIKAWA &
H. YAMASHITA
INVENTORS

BY Stevens, Davis, Miller & Mosher
ATTORNEYS

DEGAUSSING DEVICE FOR COLOR TELEVISION RECEIVER

This invention relates to a degaussing device for a color television receiver, wherein the degaussing time is extremely shortened and the value of a current flowing through the degaussing coil after the degaussing is completed is minimized.

Among the conventional degaussing devices for color television receivers are the thermistor having a negative temperature coefficient varistor type, thermal relay type, condenser charging type and capacitance-inductance resonance type ones. Disadvantageously, however, such conventional devices are not perfectly satisfactory since the time required for completion of the degaussing operation is long, the operation is semiautomatic and/or the manufacturing costs are high.

This invention is intended to eliminate the foregoing drawbacks of the conventional devices. It is an object of the present invention to provide a degaussing device of a color television receiver, which is freed from the aforementioned disadvantages of the conventional ones, so designed as to work very satisfactorily and yet can be manufactured at a lower cost by making use of a thermistor having a positive temperature coefficient, and a thermistor having a negative temperature coefficient and a varistor.

Other objects, features and advantages of the present invention will become apparent from the following description taken in conjunction with the accompanying drawings, in which.

Figure 1:
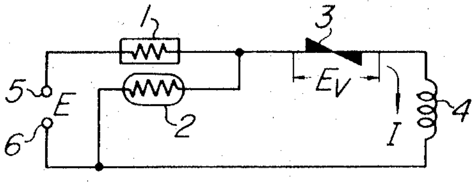
FIG. 1 is an electric circuit diagram showing the degaussing device for a color television receiver according to an embodiment of the present invention.

With reference to the drawings, the present invention will be described in further detail. Referring first to FIG. 1 of the drawings, there is shown the circuit arrangement embodying the present invention, wherein numeral 1 represents a thermistor having a positive temperature coefficient (referred to as PTC thermistor hereinafter), 2 a thermistor having a negative temperature coefficient (referred to as NTC thermistor hereinafter), 3 a varistor, 4 a degaussing coil wound on the periphery of a picture tube for a color television receiver, and 5 and 6 power source connecting terminals respectively. In this circuit arrangement, the power source connecting terminal 5 is connected to one of the terminals of the PTC thermistor 1, and the NTC thermistor 2 is inserted between the other terminal of the PTC thermistor 1 and the other power source connecting terminal 6. Further, the degaussing coil 4 and varistor 3 which are connected in series with each other are connected in parallel with aforementioned NTC thermistor 2. The PTC thermistor 1 and NTC thermistor 2 are thermally coupled to each other. With the foregoing arrangement, a voltage Ev applied across the varistor 3 is given by:

$$Ev=\frac{R_2}{R_2+R_1}E-\frac{R_2R_1+R_2R_4+R_4R_1}{R_2+R_1}I \qquad (1)$$

where $R_1$ is the resistance value of the PTC thermistor 1, $R_2$ the resistance value of the NTC thermistor 2, $R_4$ the resistance value of the degaussing coil 4, and $I$ the value of a current flowing through the varistor 3 and degaussing coil 4. On the other hand, the voltage-current characteristics of the varistor 3 are represented by $$I=\left(\frac{Ev}{C}\right)^{\alpha} \qquad (2)$$

where $C$ and $\alpha$ are constants representing the characteristics of the varistor. Thus, a current which is determined from the intersection between equations 1 and 2 will be caused to flow through the varistor 3, and naturally the same current will also be caused to flow through the degaussing coil 4 connected in series with the varistor 3.

The purpose of effecting degaussing in a color television receiver may be achieved by initially flowing a current of several amperes through the degaussing coil 4 wound on the outer periphery of the color picture tube and thereafter flowing therethrough an oscillating alternate current of which the amplitude is gradually decreased. In this case, the higher the initial current, the lower the residual current which will occur after the former has been decreased down to a predetermined level, the better.

Figure 2:
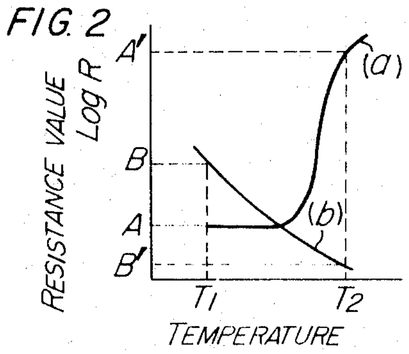
FIG. 2 is a view showing the resistance-temperature characteristics of a thermistor having a positive temperature coefficient and thermistor having a negative temperature coefficient which are used for the device shown in FIG. 1.

In order to give better understanding of what has been described just above, description will now be made of the resistance-temperature characteristics of the PTC thermistor 1 and the NTC thermistor 2. In FIG. 2, the curve (*a*) represents the characteristic of the PTC thermistor 1, and the curve (*b*) the characteristic of the NTC thermistor 2, wherein it is assumed that A indicates the resistance value $R_{1A}$ of the PTC thermistor 1 at a temperature of $T_1$ and B the resistance value $R_{2B}$ of the NTC thermistor 2 at the same temperature. Further, A′ indicates the resistance value $R_{1A}'$ of the PTC thermistor 1 at a temperature of $T_2$, and B′ the resistance value $R_{2B}'$ of the NTC thermistor 2 at the same temperature. $T_1$ is the room temperature, and $T_2$ is considerably higher than $T_1$.

Figure 3:
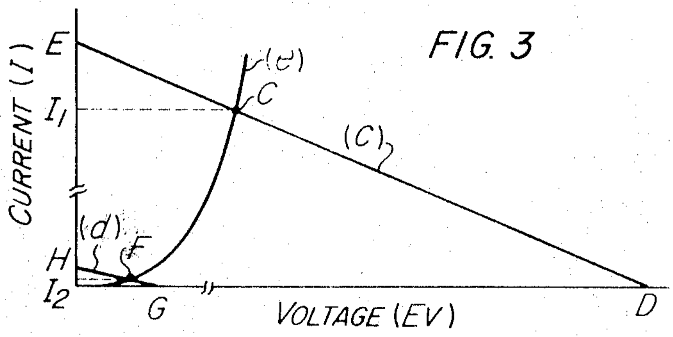
FIG. 3 is a view showing the load-line characteristics of said device.

FIG. 3 illustrates the operational transition which occurs in the circuit of FIG. 1 between a point of time immediately after the power source voltage was applied and a point of time which is sufficiently spaced apart from the first point of time.

In FIG. 3, the straight line (*c*) represents the load-line which is obtained immediately after the power source was applied, namely at room temperature. That is, this load-line can be obtained by substituting $R_{1A}$ and $R_{2B}$ for $R_1$ of the PTC thermistor 1 and $R_2$ of the NTC thermistor 2 in equation 1 respectively. The line (*d*) represents the relationship between the voltage and the current which holds after the lapse of a sufficient time from the time when the power source was applied. That is, the straight line (*d*) is the load-line at the temperature $T_2$, which can be obtained by substituting $R_{1A}'$ and $R_{2B}'$ for $R_1$ and $R_2$ in equation 1 respectively. The curve (*e*) is the voltage-current characteristic of the varistor 3, which is represented by equation 2.

Thus, at the temperature $T_1$, the operating point falls at the intersection of the straight line (*c*and the curve (*e*), so that a current which is determined from the intersection C will flow through the varistor 3 and degaussing coil 4, the value of the this current being assumed to be $I_1$. Here, the point D is given by $$\frac{R_{2B}}{R_{2B}+R_{1A}}E \qquad (3)$$

and the point E is given by $$\frac{R_{2B}}{R_{2B}R_4+R_{2B}R_{1A}+R_4R_{1A}}E \qquad (4)$$

At the temperature $T_2$, on the other hand, the operating point falls at the intersection of the straight line (*d*) and the curve (*e*), so that a current which is determined from the intersection F will flow through the varistor 3 and degaussing coil 4, the value of this current being assumed to be $I_2$. Similarly, the point G is represented by:

$$\frac{R_{2B}'}{R_{2B}'+R_{1A}'}E \qquad (5)$$

and the point H is represented by:

$$\frac{R_{2B}'}{R_{2B}'R_4+R_{2B}'R_{1A}'+R_4R_{1A}'}E \qquad (6)$$

Description will next be made of $T_1$, $T_2$, $R_{1A}$, $R_{2B}$, $R_{1A}'$ and $R_{2B}'$. At a point of time immediately after the power source was applied, the PTC thermistor 1 and the NTC thermistor 2 are at room temperature or $T_1$, and their resistance values are $R_{1A}$ and $R_{2B}$ respectively. Thereafter, however, the temperature of the PTC thermistor 1 will be raised up to $T_2$ which is higher than $T_1$ due to self-heating which results from the fact that the sum of the current $I_1$ flowing through the varistor 3 and degaussing coil 4 and a current, which is sufficiently lower than $I_1$, flowing through the NTC thermistor 2 is caused to flow through the PTC thermistor 1. This temperature $T_2$ depends upon the configuration, size, resistance value $R_{1A}$ and resistance increase starting temperature of the PTC thermistor 1, the configuration and size of the NTC thermistor 2 which is thermally coupled to the PTC thermistor 1, the thermal resistance between the two thermistors, and so forth. At the temperature $T_2$, the resistance values of the PTC thermistor 1 and NTC thermistor 2 become $R_{1A}'$ and $R_{2B}'$ respectively, which may be represented by:

$$R_{1A}' = mR_{1A} \quad (7)$$

$$R_{2B}' = \frac{1}{n}R_{2B} \quad (8)$$

where $m$ and $n$ depend upon various conditions, but their practical ranges are as follows:

$m$:100 to 1,000

$n$:10 to 100

Returning again to FIG. 3, it is at first necessary to make high the voltage corresponding to the point D represented by equation 3 and that corresponding to the point E represented by equation 4, namely, to make $R_{1A}$ low and $R_{2B}$ high for the purposes of increasing the initial current $I_1$ and decreasing the residual current $I_2$.

Then, it is necessary to make low the voltage corresponding to the point G represented by equation 5 and that corresponding to the point H represented by equation 6, that is, to make $R_{1A}'$ high and $R_{2B}'$ low. To this end, it is essential to select high values for $m$ in equation 7 and $n$ in equation 8. In addition, it is desirable that the constant $\alpha$ of the varistor 3 be also great.

Figure 4:
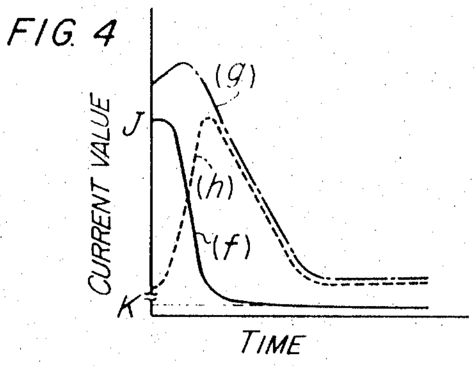
FIG. 4 is a view showing the current characteristics of each element shown in FIG. 1.

Referring to FIG. 4, there are shown the relationships between the values of currents flowing through the respective elements and the period of time after application of the power source, wherein only the positive-going components of the currents are shown for the convenience of explanation because the positive-going and negative-going components of these currents are symmetrical. (*f*) represents the current flowing through the varistor 3 and degaussing coil 4, (*g*) the current flowing through the PTC thermistor 1, and (*h*) the current flowing through the NTC thermistor 2. Points J and K indicate the values of $I_1$ and $I_2$ respectively.

As will be seen from the circuit arrangement of FIG. 1, the current (*f*) flowing through the degaussing coil 4 is provided by subtracting the current (*h*) flowing through the NTC thermistor 2 from the current (*g*) flowing through the PTC thermistor 1. It is to be noted here that the current flowing through the PTC thermistor 1 decreases in a short time after the power source switch was turned on, whereas the current flowing through the degaussing coil 4 which is actually required to produce the degaussing effect decreases in a shorter time than that. This is because of the fact that the current (*h*) flowing through the NTC thermistor 2 begins rapidly increasing immediately after the power source was turned on, thus approaching to the curve (*g*).

The reason for the above is that the temperature of the NTC thermistor 2 is rapidly elevated due to the fact that it is also subjected to self-heating which results from the voltage which was applied thereto immediately after the power source switch was turned on, so that the resistance value thereof is decreased with a result that a higher current is caused to flow therethrough. Thus, simultaneous occurrence of self-heating actions of the NTC and PTC thermistors 1 and 2 results in the achievement of a very short operating time, which constitutes one of the novel features of the present invention. Under a stable condition where a sufficient time has lapsed, the voltage applied across the NTC thermistor 2 and current flowing therethrough are so low that little or no self-heating effect is produced, but the NTC thermistor 2 is maintained at a high temperature by being provided with heat which results from the self-heating of the PTC thermistor 1.

A practical example of the arrangement embodying the present invention will be described in order to show the excellent characteristics thereof. The PTC thermistor 1 had a dimension of 15Φ×3*t*, $R_{1A}$=15 Ω and rapid resistance increasing starting temperature of 75° C., while the NTC thermistor 2 had a dimension of 14Φ×2*t*, $R_{2B}$=300 Ω and B constant of 3500° K. These two thermistors were thermally coupled to each other at one electrode by means of soldering. The varistor 3 had a dimension of 25Φ×2*t*, a current value of 100 ma. at 8 v. and $\alpha \approx 3$, and the degaussing coil 4 had a resistance of 20 Φ. For a power source voltage of 120 v., the initial current flowing in the degaussing coil 4 was about 3.5 a. to 4 a. (from zero to peak), and the residual current was about 0.05 ma. to 0.1 ma. The initial current $I_1$ decreased down to about one-tenth in 1 second.

Considering the fact that at the present time color television receivers are constructed in the fixed start system wherein a picture is produced upon the turning on of the power switch, it is an important point that the period of time in which the initial current decreases goes down to about one-tenth, which constitutes a great advantage. From the initial current $I_1$ and residual current $I_2$, too, it is seen that very satisfactory characteristics have been achieved.

As will be appreciated from the foregoing, the following advantages can be obtained by elaborately utilizing the actions of a PTC thermistor, an NTC thermistor and a varistor in accordance with the present invention. That is, the present device is constructed in a full-automatic degaussing system wherein the degaussing operation is automatically performed by merely turning on the power source switch without requiring any other degaussing manipulation. Furthermore, the operating time is very short, and the initial current is high while the residual current is very low. And yet these currents can easily be controlled in accordance with the characteristics of the PTC thermistor, NTC thermistor and the varistor. Still furthermore, being of the contactless type, the present device is free from any contact noises and commercial power source can be used as it is, so that the device can be designed independently of the other circuits incorporated in the television receiver, thus avoiding trouble which tends to occur in constructing such a circuit. Another important advantage is that the device of this invention can be produced at relatively low cost.

What is claimed is:

1. A degaussing device for a color television receiver, wherein a varistor and a degaussing coil are connected in series with each other, a first thermistor having a negative temperature coefficient is connected in parallel with the series circuit of said varistor and said degaussing coil, and a second thermistor having a positive temperature coefficient is connected in series with the parallel circuit of said series circuit and said first thermistor, said first and second thermistors being thermally coupled with each other and being connected with a power source.

* * * * *